US011403112B2

(12) United States Patent
Arai

(10) Patent No.: US 11,403,112 B2
(45) Date of Patent: Aug. 2, 2022

(54) INFORMATION PROCESSING APPARATUS, METHOD OF STARTING UP AN INFORMATION PROCESSING APPARATUS

(71) Applicant: Mami Arai, Tokyo (JP)

(72) Inventor: Mami Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 394 days.

(21) Appl. No.: 16/675,590

(22) Filed: Nov. 6, 2019

(65) Prior Publication Data

US 2020/0150975 A1 May 14, 2020

(30) Foreign Application Priority Data

Nov. 8, 2018 (JP) .............................. JP2018-210535
Jan. 22, 2019 (JP) .............................. JP2019-008765

(51) Int. Cl.
*G06F 9/4401* (2018.01)
*G06F 9/54* (2006.01)
*G06F 9/48* (2006.01)

(52) U.S. Cl.
CPC .............. *G06F 9/4406* (2013.01); *G06F 9/48* (2013.01); *G06F 9/542* (2013.01)

(58) Field of Classification Search
CPC .......... G06F 9/4406; G06F 9/48; G06F 9/542; G06F 9/4843
See application file for complete search history.

(56) References Cited

U.S. PATENT DOCUMENTS

| 8,699,044 | B2 | 4/2014 | Nakahara | |
|---|---|---|---|---|
| 9,003,174 | B2 * | 4/2015 | Lai | G06F 9/4405 713/2 |
| 2005/0210232 | A1 * | 9/2005 | Hsu | G06F 11/2284 714/E11.149 |
| 2007/0220246 | A1 * | 9/2007 | Powell | G06F 9/45533 713/2 |
| 2010/0174895 | A1 * | 7/2010 | Pierce | G06F 9/4405 714/13 |
| 2011/0197193 | A1 * | 8/2011 | Miyabe | G06F 9/545 718/100 |

FOREIGN PATENT DOCUMENTS

| JP | 2003-337711 | 11/2003 |
|---|---|---|
| JP | 2005-202105 | 7/2005 |
| JP | 5247527 | 7/2013 |
| JP | 2016-167816 | 9/2016 |

* cited by examiner

*Primary Examiner* — Jaweed A Abbaszadeh
*Assistant Examiner* — Brian J Corcoran
(74) *Attorney, Agent, or Firm* — IPUSA, PLLC

(57) ABSTRACT

An information processing apparatus according to one aspect of the present invention includes a main body and an operation device. The operation device executes an operating system (OS) and a program task operating independently of the OS. The program task is configured to start up earlier than the OS and to perform a part of a start up process required for starting up the operation device. When the main body and the operation device are started, the operation device starts executing the program task in addition to starting execution of the OS. In response to a completion of performing the part of the start up process, the program task transmits a ready state notification to the main body.

10 Claims, 14 Drawing Sheets

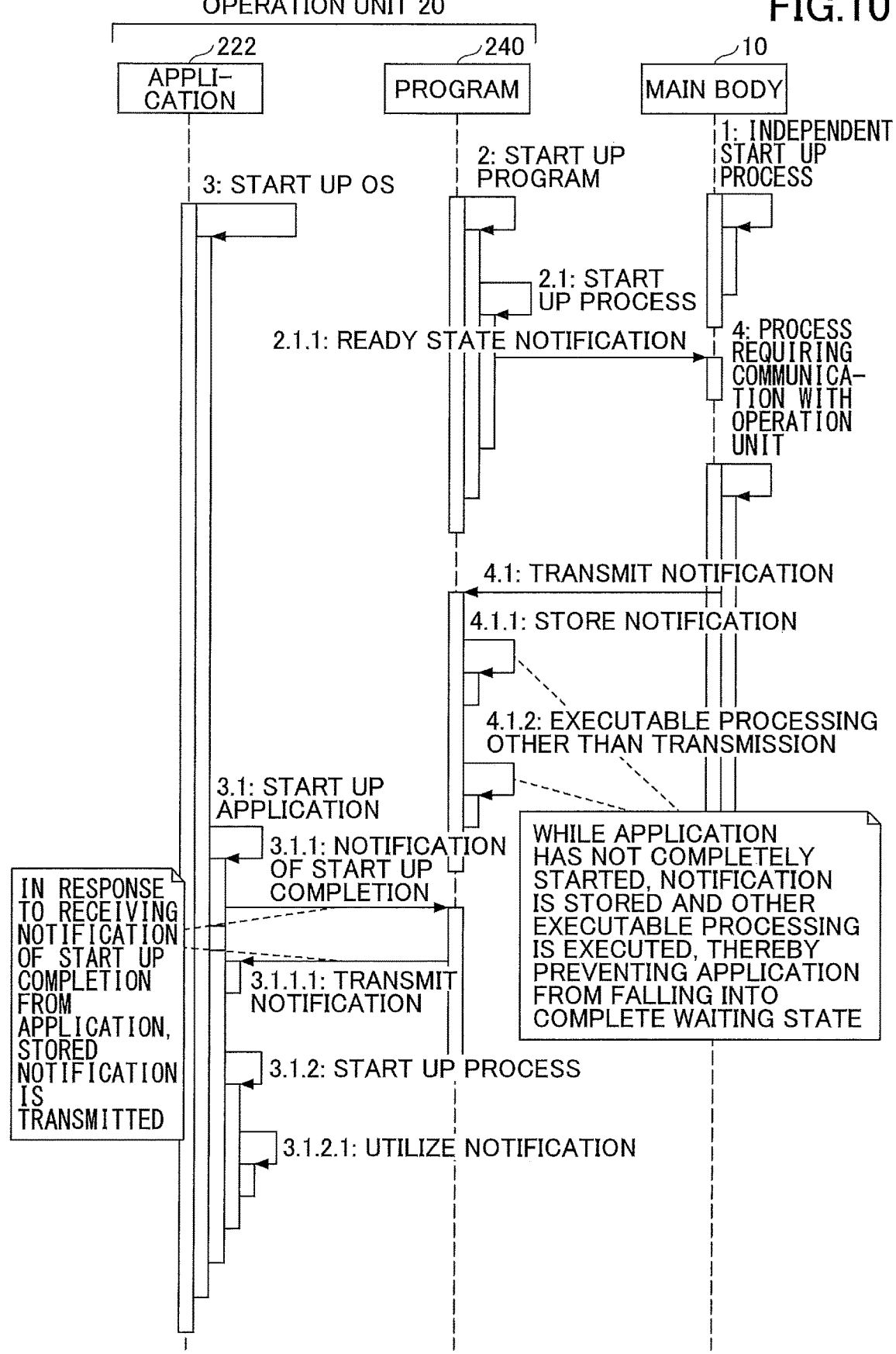

INFORMATION PROCESSING APPARATUS, METHOD OF STARTING UP AN INFORMATION PROCESSING APPARATUS

CROSS-REFERENCE TO RELATED APPLICATION

The present application claims priority under 35 U.S.C. § 119 to Japanese Patent Application No. 2018-210535, filed on Nov. 8, 2018, and Japanese Patent Application No. 2019-008765, filed on Jan. 22, 2019, the contents of which are incorporated herein by reference in their entirety.

BACKGROUND OF THE INVENTION

1. Field of the Invention

The present disclosure relates to an information processing apparatus and a method of starting up an information processing apparatus.

2. Description of the Related Art

In an information processing apparatus including a main body having a main function and an operation device for operating the function of the main body, a configuration in which each of the main body and the operation device has a different CPU is known. In such an information processing apparatus, an application program (may also be referred to as an "application") provided in an operation device manages the connection between the operation device and the main body, for example. When starting up, the information processing apparatus performs a start up process in the following order.

(1) The main body and the operation device initiate start up processes respectively.

(2) Just before executing a process that requires communication with the operation device, the main body waits for a ready state notification from an application of the operation device.

(3) After an OS in the operation device starts, the application on the OS starts, and the application sends a ready state notification to the main body.

(4) The main body receives the ready state notification, connects with the operation device, and completes the start up process.

Because the application of the operation device runs on the OS of the operation device, the application cannot be started until the OS of the operation device starts up, and the ready state notification cannot be sent until then. The main body was waiting for the ready state notification early, and time to start up was excessive because the processing could not be continued.

CITATION LIST

Patent Literature

[Patent Document 1] Japanese Unexamined Patent Application Publication No. 2003-337711

[Patent Document 2] Japanese Unexamined Patent Application Publication No. 2005-202105

SUMMARY OF THE INVENTION

An information processing apparatus according to one aspect of the present disclosure includes a main body and an operation device. The operation device executes an operating system (OS) and a program task operating independently of the OS. The program task is configured to start up earlier than the OS and to perform a part of a start up process required for starting up the operation device. When the main body and the operation device are started, the operation device starts executing the program task in addition to starting execution of the OS. In response to a completion of performing the part of the start up process, the program task transmits a ready state notification to the main body.

BRIEF DESCRIPTION OF THE DRAWINGS

FIG. 10 is an external start up sequence diagram according to the third variation;

DESCRIPTION OF THE EMBODIMENTS

Figure 1:
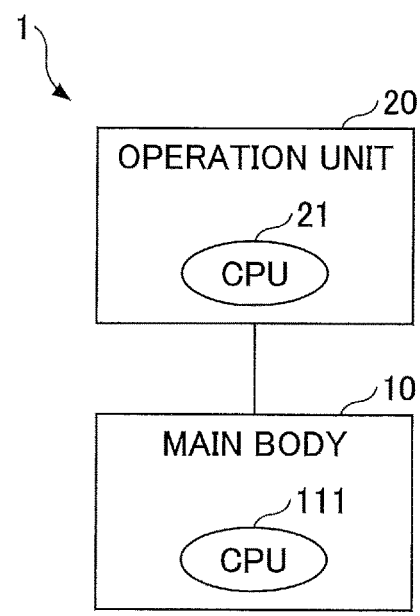
FIG. 1 is a general configuration view of an information processing apparatus according to an embodiment.

Hereinafter, embodiments will be described with reference to the accompanying drawings. In order to facilitate the understanding of the description, in each drawing, the same elements are designated by the same reference numerals as far as possible and overlapping description may be omitted.

Embodiment

An embodiment will be described with reference to FIGS. 1 to 6. FIG. 1 is a diagram illustrating an overall configuration of an information processing apparatus 1 according to the present embodiment.

An example of the information processing apparatus 1 includes a multifunctional device called an MFP (Multifunction Peripheral/Printer/Product), that is, a device having an image processing function and a communication function, such as a facsimile, a scanner, a photocopier, or a printer. As illustrated in FIG. 1, the information processing apparatus 1 is a single device having a main body 10 and an operation device 20. In the present embodiment, the operation device 20 may also be referred to as an operation unit 20.

The main body 10 includes major functions such as the aforementioned image processing function and communication function. The operation unit 20 is a device that is configured to receive operations of each function of the main body 10 by a user. The main body 10 and the operation unit 20 includes CPUs 111 and 21 (first CPU and second CPU) respectively, and the main body 10 is operated by the CPU 111, and the operation unit 20 is operated by the CPU 21. The main body 10 and the operation unit 20 are connected with each other via a communication means such as USB.

Figure 2:
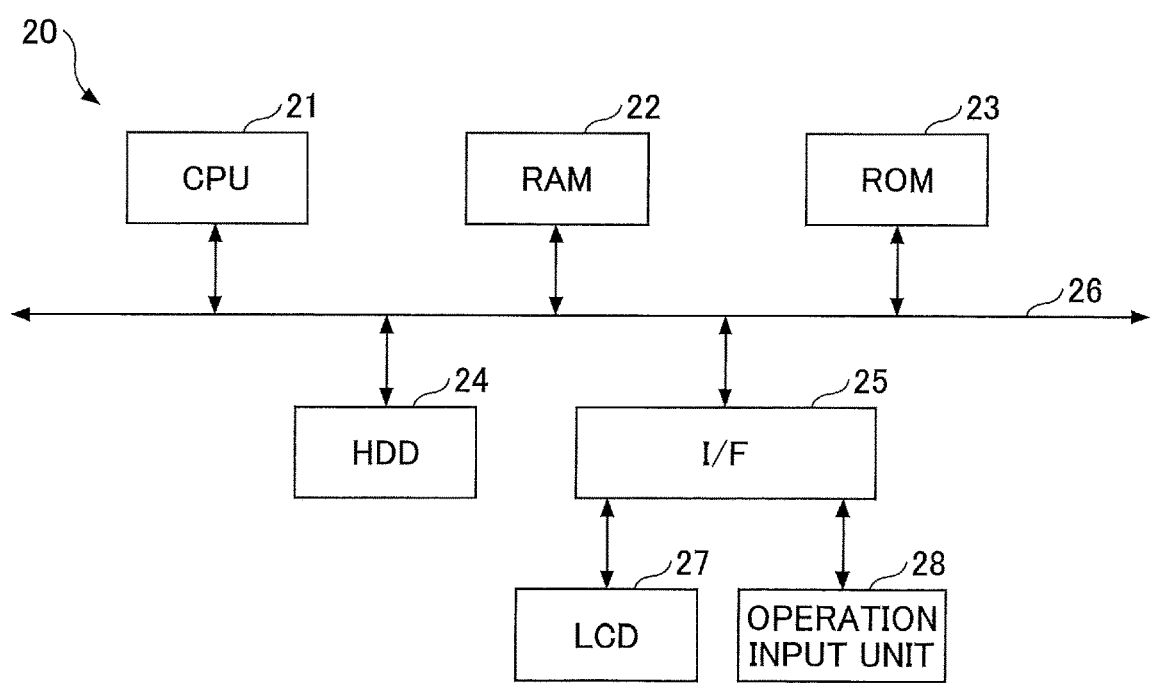
FIG. 2 is a diagram illustrating a hardware configuration of an operation device.

FIG. 2 is a hardware configuration diagram of the operation unit 20. In the present embodiment, the operation unit 20 has the same configuration as a general information processing terminal. That is, the operation unit 20 includes the CPU (Central Processing Unit) 21, a RAM (Random Access Memory) 22, a ROM (Read Only Memory) 23, an HDD (Hard Disk Drive) 24, and an I/F (interface) 25, each of which is interconnected via a bus 26. An LCD (Liquid Crystal Display) 27 and an operation input unit 28 are connected to the I/F 25.

The CPU 21 is an arithmetic operating unit, and controls an entire operation of the operation unit 20.

The RAM 22 is a volatile storage medium capable of high-speed reading and writing of information, and is used as a working area when the CPU 21 performs information processing.

The ROM 23 is a non-volatile and read-only storage medium. Programs such as firmware are stored in the ROM 23.

The HDD 24 is a non-volatile storage medium capable of reading and writing information, and stores an OS (operating system), various control programs, application programs, and the like.

The I/F 25 connects and controls various hardware, networks, and the like with the bus 26.

The LCD 27 is a visual user interface that is used by a user to check a state.

The operation input unit 28 is a user interface for a user inputting information. An example of the operation input unit 28 includes a keyboard and a mouse.

Figure 3:
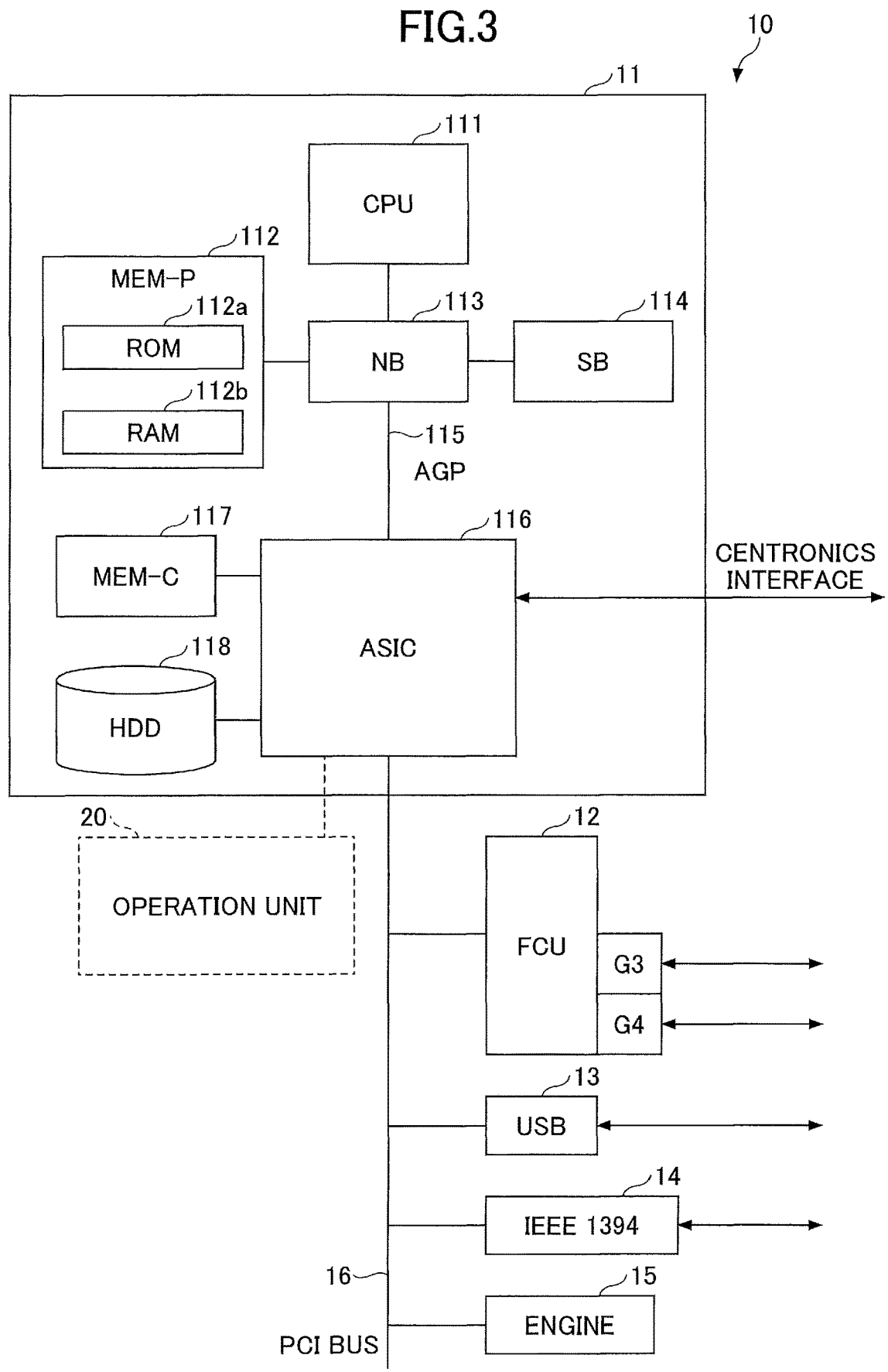
FIG. 3 is a diagram illustrating a hardware configuration of a main body.

FIG. 3 is a diagram illustrating a hardware configuration of the main body 10. As illustrated in FIG. 3, the main body 10 includes a controller 11, and an engine 15 connected to the controller 11 via a PCI (Peripheral Component Interconnect) bus 16.

The controller 11 controls an entirety of the main body 10, and controls rendering processing, communication processing, and processing for receiving input the operation unit 20.

The engine 15 may be a printer engine or the like connectable to the PCI bus 16, such as a black-and-white plotter, a one-drum color plotter, a four-drum color plotter, a scanner, or a fax unit. Incidentally, the engine 15 includes a section for image processing such as error diffusion or gamma conversion, in addition to an engine section such as a plotter.

The controller 11 includes the CPU 111, a northbridge (NB) 113, a system memory (MEM-P) 112, a southbridge (SB) 114, a local memory (MEM-C) 117, an ASIC (Application Specific Integrated Circuit) 116, and a hard disk drive (HDD) 118. The ASIC 116 is connected with the northbridge (NB) 113 via an AGP (Accelerated Graphics Port) bus 115. The MEM-P 112 includes a ROM 112a and a RAM 112b.

The CPU 111 controls an entirety of the main body 10, and is connected to a chipset consisting of the NB 113 and the SB 114. The CPU 111 is connected to other devices via this chipset.

The NB 113 is a bridge for connecting the CPU 111 to the MEM-P 112, the SB 114, and the AGP bus 115. The NB 113 includes a memory controller for controlling access to the MEM-P 112, and has a PCI master function and an AGP target function.

The MEM-P 112 is a system memory used as a memory for storing a program and data, a memory for deploying programs and data, a memory for rendering of a printer, and the like. The MEM-P 112 includes the ROM 112a and the RAM 112b.

The ROM 112a is a read-only memory used for storing a program and data, and the RAM 112b is a readable and writeable memory used as a memory for deploying a program or data, a rendering memory of a printer, or the like.

The SB 114 is a bridge for connecting PCI devices and peripheral devices to the NB 113. The SB 114 is connected to the NB 113 via a PCI bus. To this PCI bus, a network interface (I/F) or the like is also connected.

The ASIC 116 is an integrated circuit (IC) for image processing that has a hardware element for image processing. The ASIC 116 also serves as a bridge to which the AGP bus 115, the PCI bus 16, the HDD 118, and the MEM-C 117 are connected.

The ASIC 116 includes PCI target and AGP master functions, an arbiter (ARB) that forms a core of the ASIC 116, a memory controller that controls the MEM-C 117, multiple DMACs (Direct Memory Access Controllers) that rotate image data by hardware logic or the like, and a PCI unit that transfers data between the ASIC 116 and the engine 15 via the PCI bus 16.

An FCU (Facsimile Control Unit) 12, a USB (Universal Serial Bus) 13, and an IEEE (Institute of Electrical and Electronics Engineers) 1394 interface 14 are connected to the ASIC 116 via the PCI bus 16. In addition, the operation unit 20 is directly connected to the ASIC 116.

The MEM-C 117 is a local memory used as an image buffer for copying and a code buffer.

The HDD 118 is a storage device for storing image data, programs, font data, and forms. The HDD 118 stores a license file of an application program executed in the main body 10.

The AGP bus 115 is a bus for a graphics accelerator card designed to accelerate graphics processing, and to speed up processing of the graphics accelerator card by directly accessing the MEM-P 112 with high throughput.

Figure 4:
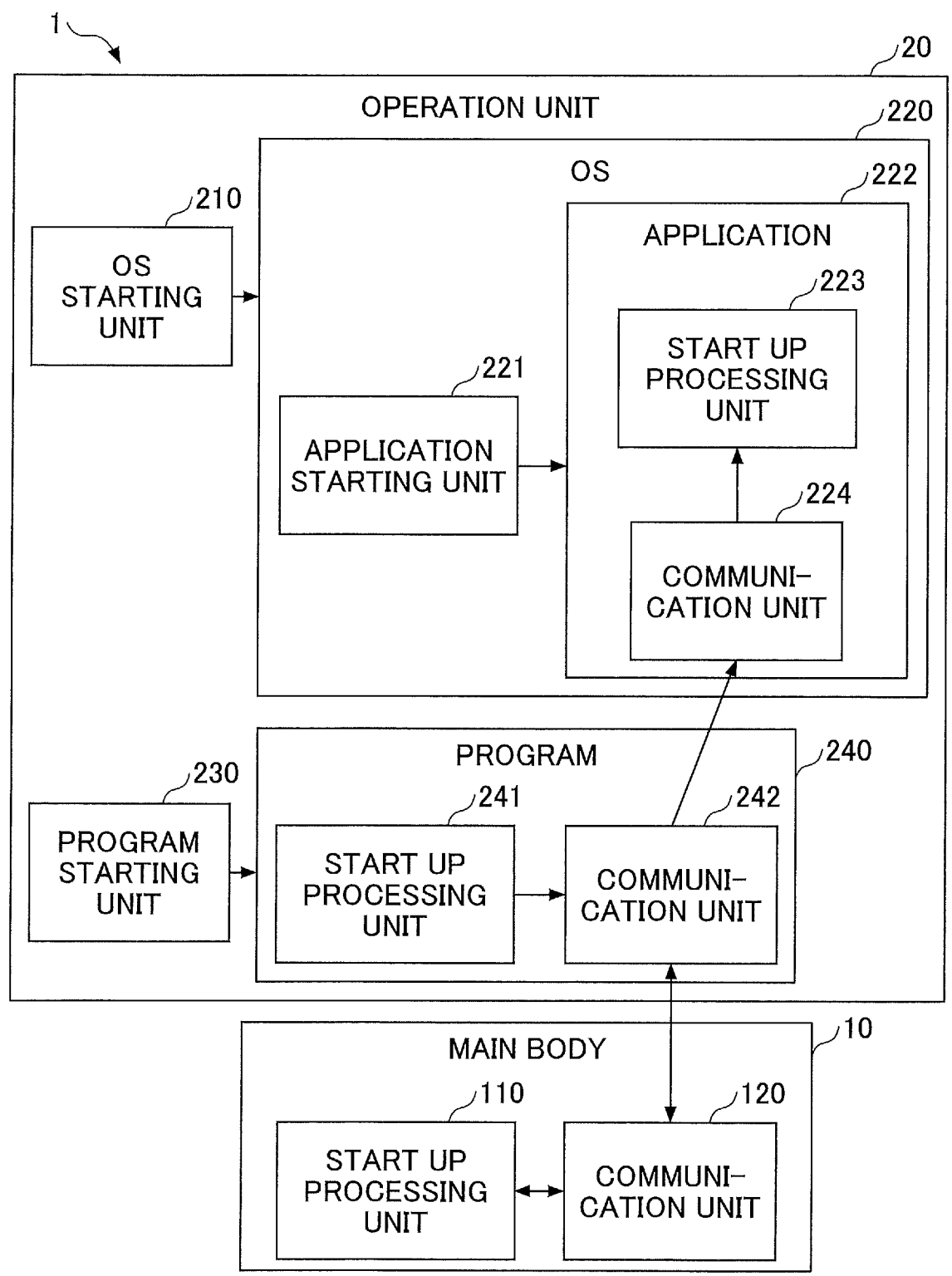
FIG. 4 is a functional block diagram of the information processing apparatus.

FIG. 4 is a functional block diagram of the information processing apparatus 1. The operation unit 20 includes functional blocks of an OS (Operating System) starting unit 210, an OS 220, a program starting unit 230, and a program module 240. The program module 240 may also be referred to as a "program 240".

The OS starting unit 210 starts up the OS 220. For example, when the operation unit 20 receives an instruction of starting up the operation unit 20 (power-on instruction) from a user through the operation input unit 28, execution of the OS starting unit 210 is started, and the OS starting unit 210 starts up the OS 220.

The OS 220 includes an application starting unit 221 and an application 222. The application starting unit 221 starts up the application 222.

The application 222 is provided in the OS 220 of the operation unit 20, and runs on the OS 220. The application 222 manages connection between the main body 10 and the operation unit 20, and performs a process of starting up the operation unit 20 (may also be referred to as a start up process). The application 222 includes a start up processing unit 223 and a communication unit 224. The start up processing unit 223 performs the start up process of the operation unit 20. The start up processing unit 223 receives a notification from the main body 10 through the communication unit 224, and utilizes the notification for the start up process. The communication unit 224 receives the notification necessary for the start up process from the main body 10, and passes the notification to the start up processing unit 223. The application 222 illustrated in FIG. 4 represents a functional block, and in the present embodiment, various processes performed by the application 222 may be referred to as an "application task". As will be described below, the application 222 is implemented by a computer program being executed by the processor (the CPU 21) in the operation unit 20. Thus, the application task is executed by the CPU 21.

The program starting unit 230 starts up the program 240. Similar to the OS starting unit 210, when the operation unit 20 receives the power-on instruction from a user through the operation input unit 28, execution of the program starting unit 230 is started and the program starting unit 230 starts up the program 240. The OS starting unit 210 and the program starting unit 230 may be started at the same time in response to the power-on instruction from a user. Also, in another embodiment, instead of providing the OS starting unit 210 and the program starting unit 230 in the operation unit 20, a single functional block having functions of both the OS starting unit 210 and the program starting unit 230 may be provided.

The program 240 is a functional block provided in the operation unit 20 separately from the OS 220, and the program 240 can operate independently of the OS 220. A time required for starting up the program 240 is shorter than a time for starting up the OS 220. The program 240 performs a part of the start up process of the operation unit 20. The program 240 includes a start up processing unit 241 and a communication unit 242. The start up processing unit 241 performs the part of the start up process of the operation unit 20. After a process to be performed by the program 240 (start up processing unit 241) is completed, the start up processing unit 241 generates a ready state notification indicating that the operation unit 20 becomes communicable with the main body 10, and passes the ready state notification to the communication unit 242. The communication unit 242 transmits the ready state notification received from the start up processing unit 241 to the main body 10. Also, the communication unit 242 passes a notification received from the main body 10 to the communication unit 224 of the application 222. In the present embodiment, various processes performed by the program 240 may be referred to as a "program task". As will be described below, the program 240 is implemented by a computer program being executed by the processor (the CPU 21) in the operation unit 20. Thus, the program task is executed by the CPU 21.

The main body 10 includes a start up processing unit 110 and a communication unit 120.

The start up processing unit 110 performs a process necessary for starting up the main body 10. The start up processing unit 110 transmits and/or receives a notification necessary for the start up process, to and/or from the operation unit 20 through the communication unit 120. For example, the start up processing unit 110 receives the aforementioned ready state notification through the communication unit 120.

When the communication unit 120 receives the ready state notification from the communication unit 242 of the program 240 in the operation unit 20, the communication unit 120 passes the ready state notification to the start up processing unit 110. The communication unit 120 also passes a notification received from the start up processing unit 110 to the operation unit 20.

Functions of the OS starting unit 210, the OS 220, the program starting unit 230, the program 240, the application starting unit 221, the application 222, the start up processing units 223 and 241, and the communication units 224 and 242 of the operation unit 20 in the information processing apparatus 1 illustrated in FIG. 4 are realized by reading given computer software (a start up program) on the hardware of the operation unit 20, such as the CPU 21 and the RAM 22, thereby operating various hardware under control of the CPU 21, and reading and writing data in the RAM 22 and the HDD 24. Further, functions of the start up processing unit 110 and the communication unit 120 in the main body 10 are realized by reading given computer software (a start up program) on the hardware of the main body 10 such as the CPU 111 and the RAM 112b, operating various hardware under the control of the CPU 111, and reading and writing data in the RAM 112b and the HDD 118. That is, by running the start up programs on processors (CPU 21 and CPU 111) in the information processing apparatus 1 according to the present embodiment, the operation unit 20 of the information processing apparatus 1 functions as the OS starting unit 210, the OS 220, the program starting unit 230, the program 240, the application starting unit 221, the application 222, the start up processing units 223 and 241, and the communication units 224 and 242, and the main body 10 of the information processing apparatus 1 functions as the start up processing unit 110 and the communication unit 120.

Figure 5:
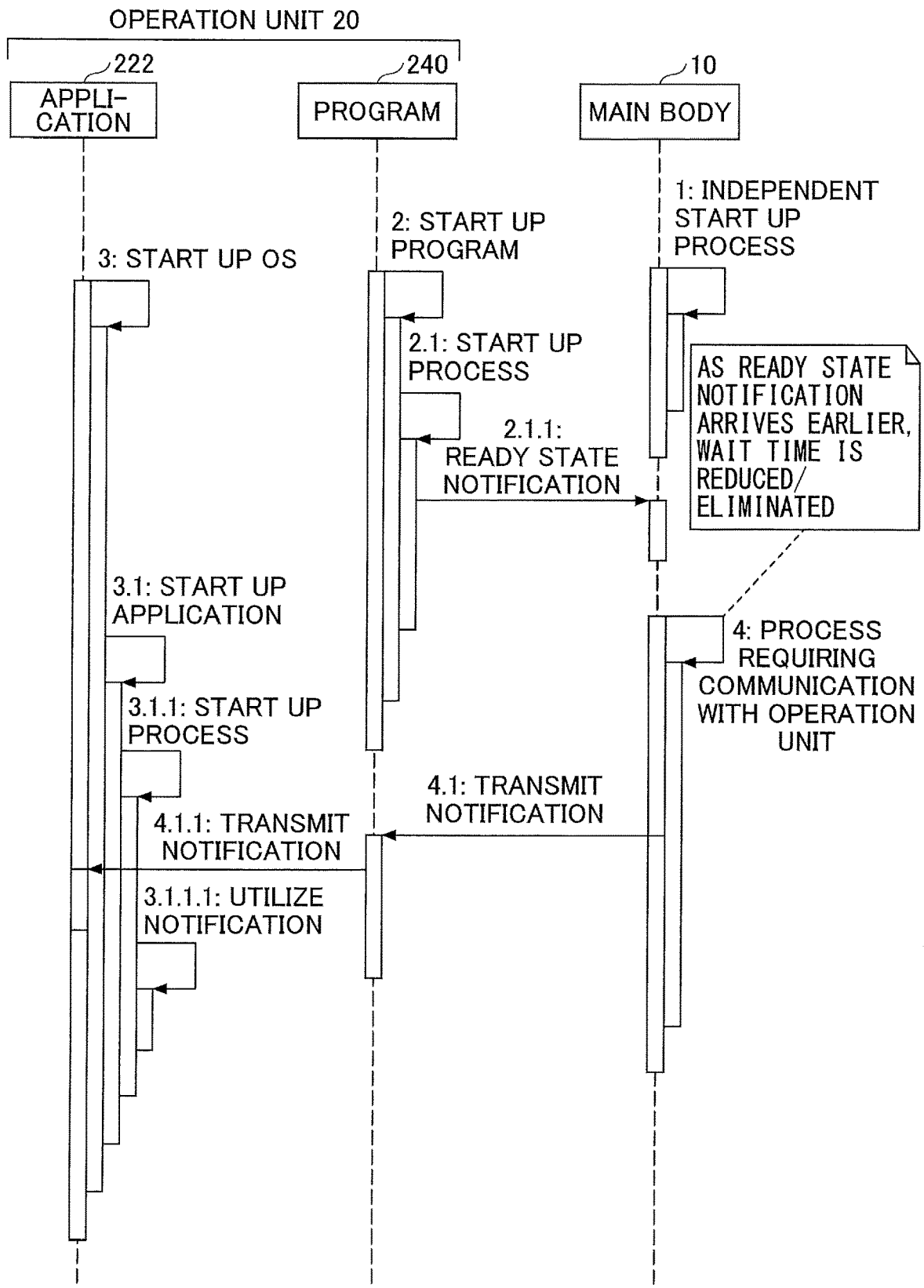
FIG. 5 is a diagram illustrating an external sequence of starting up.
Figure 6:
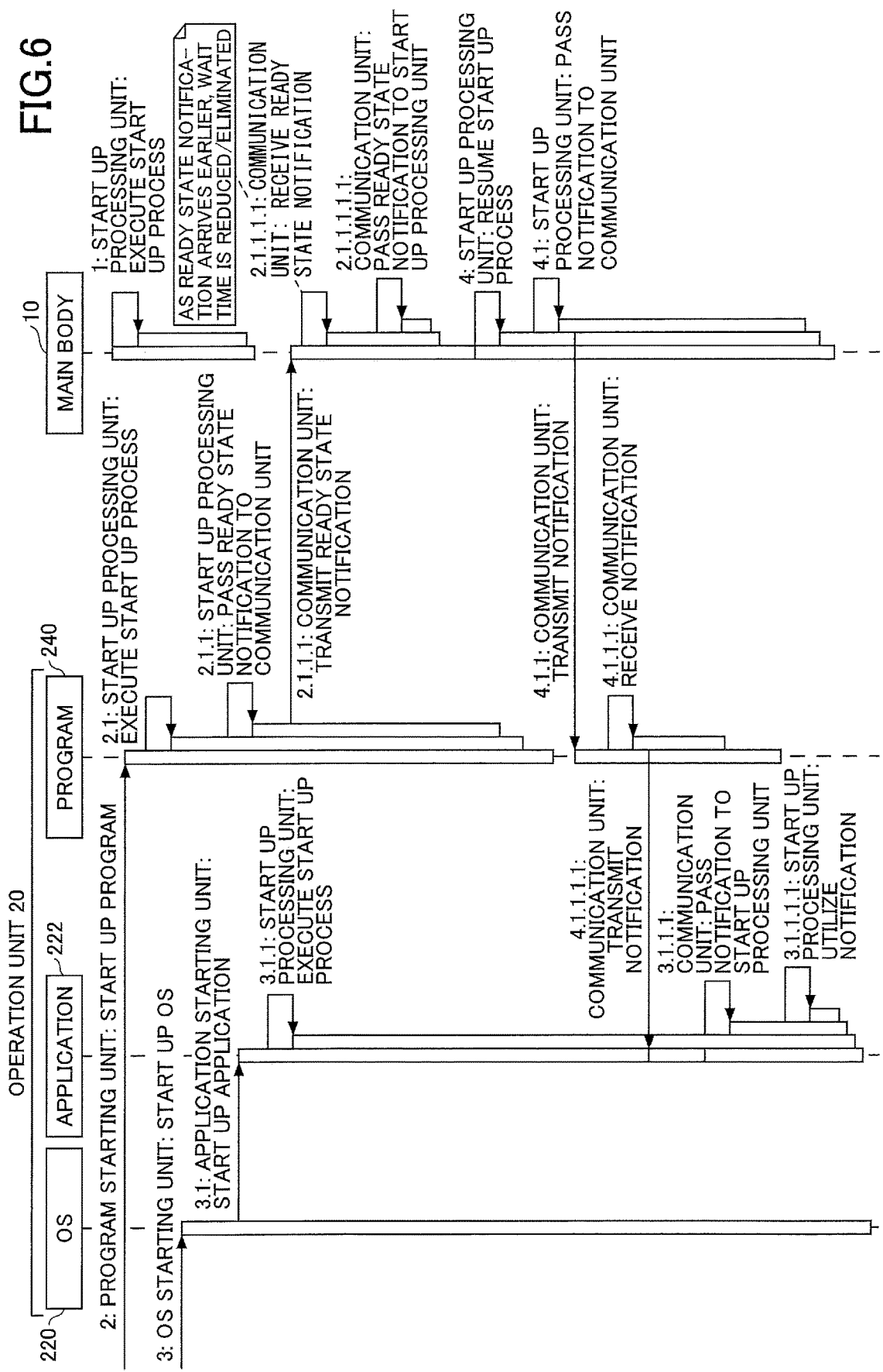
FIG. 6 is a diagram illustrating an internal sequence of starting up.

Next, a method of starting up the information processing apparatus 1 will be described with reference to FIGS. 5 and 6. FIG. 5 is a diagram illustrating an external sequence when starting up the information processing apparatus 1. FIG. 6 is a diagram illustrating an internal sequence when starting up the information processing apparatus 1. Here, the "external sequence" means a process flow viewed from the outside of the information processing apparatus 1, each process of which can be confirmed from the outside of the information processing apparatus 1. Meanwhile, the "internal sequence" means a process flow viewed from internal functions of the information processing apparatus 1 (such as the start up processing units 223 and 241 and the communication units 224 and 242).

First, the external sequence will be described with reference to FIG. 5, for each step to which a sequence number (such as "1" or "2.1") is assigned.

1: Independent Start Up Process

The main body 10 first performs a start up process that can be performed independently. When the start up process that can be performed independently is completed, the main body 10 transits to a state waiting for a ready state notification (this state may also be referred to as a "waiting state").

2: Start Up Program (Start Up Step, Start Up Function)

The program 240 of the operation unit 20 is started. The program 240 can operate outside of the OS 220.

2.1: Start Up Process (Start Up Process Steps, Start Up Process Function)

When the program 240 is started, the program 240 executes a start up process of the operation unit 20. The start up process of the operation unit 20 to be executed by the program 240 includes, for example, a minimum process required for the operation unit 20 becoming able to communicate with the main body 10.

2.1.1: Ready State Notification (Transmission Step, Transmission Function)

When the start up process to be executed is completed, the program 240 transmits a ready state notification to the main body 10.

3. Start Up OS

The OS 220 of the operation unit 20 is started.

3.1: Start Up Application

When the start up process of the OS 220 is completed, the application 222 is started on the OS 220.

3.1.1: Start Up Process

When starting of the application 222 is completed, the application 222 executes the start up process of the operation unit 20. The start up process of the operation unit 20 to be executed by the application 222 includes a process other than processes executed by the program 240 in the sequence 2.1.

4: Process Requiring Communication with Operation Unit

When the ready state notification is received, the main body 10 returns from the waiting state and performs a process that requires communication with the operation unit 20.

4.1: Communication (Notification Step, Notification Function)

The main body 10 transmits a notification to the program 240 of the operation unit 20 while the process requiring communication with the operation unit 20 is performed.

4.1.1: Communication (Notification Transmission Step, Notification Transmission Function)

Upon receipt of the notification, the program 240 of the operation unit 20 transmits the notification to the application 222.

3.1.1.1: Utilization of Notification

The application 222 of the operation unit 20 utilizes the received notification for the start up process.

Next, the internal sequence will be described with reference to FIG. 6. In the following description, a correspondence between each step of the internal sequence and the functional block illustrated in FIG. 4, and a correspondence between each step of the internal sequence and the sequence number in the external sequence diagram illustrated in FIG. 5 are denoted in accordance with the following format.

Sequence number of a step in the internal sequence: Functional block name: Details of the step (corresponding sequence number in FIG. 5)

1: Start Up Processing Unit 110: Execute Start Up Process (1)

The start up processing unit 110 of the main body 10 performs the start up process. When the start up process that can be performed independently is completed, the main body 10 transits to the state waiting for a ready state notification (waiting state).

2: Program Starting Unit 230: Start Up Program (2)

The program starting unit 230 of the operation unit 20 starts up the program 240.

2.1: Start Up Processing Unit 241: Execute Start Up Process (2.1)

The start up processing unit 241 of the program 240 executes the start up process of the operation unit 20.

2.1.1: Start Up Processing Unit 241: Pass Ready State Notification to Communication Unit (2.1.1)

When the start up process of the operation unit 20 to be executed by the program 240 is completed, the start up processing unit 241 of the program 240 passes a ready state notification to the communication unit 242. The start up process of the operation unit 20 to be executed by the program 240 includes, for example, a minimum process that enables the operation unit 20 to communicate with the main body 10.

2.1.1.1: Communication Unit 242: Transmit Ready State Notification (2.1.1)

The communication unit 242 of the program 240 transmits the ready state notification to the main body 10.

2.1.1.1.1: Communication Unit 120: Receive Ready State Notification (2.1.1)

The communication unit 120 of the main body 10 receives the ready state notification.

2.1.1.1.1.1: Communication Unit 120: Gives the Ready State Notification to the Start Up Processing Unit (2.1.1)

The communication unit 120 of the main body 10 passes the ready state notification to the start up processing unit 110.

3. OS Starting Unit 210: Start Up OS (3).

The OS starting unit 210 of the operation unit 20 starts up the OS 220.

3.1: Application Starting Unit 221: Start Up Application (3.1)

The application starting unit 221 of the operation unit 20 starts up the application 222.

3.1.1: Start Up Processing Unit 223: Execute Start Up Process (3.1.1)

The start up processing unit 223 of the application 222 executes the start up process of the operation unit 20 to be executed by the application 222. The start up process of the operation unit 20 to be executed by the application 222 includes a process other than processes executed by the program 240 in the sequence 2.1.

4: Start Up Processing Unit 110: Restart Start Up Process (4)

When the start up processing unit 110 of the main body 10 receives the ready state notification, the start up processing unit 110 returns from the waiting state, and resumes the start up process. Processes requiring communication with the operation unit 20 are performed after resuming the start up process. Therefore, in order to resume the start up process, the operation unit 20 must complete execution of the minimum process (the "start up process of the operation unit 20 to be executed by the program 240" in the sequence 2.1) that enables the operation unit 20 to communicate with the main body 10, and must be in a state communicable with the main body 10. In the present embodiment, as the ready state notification can be received earlier than a conventional system, time required for waiting for arrival of the ready state notification can be eliminated or shortened.

4.1: Start Up Processing Unit 110: Pass Notification to Communication Unit (4.1)

The start up processing unit 110 of the main body 10 passes a notification to the operation unit 20, to the communication unit 120.

4.1.1: Communication Unit 120: Transmit Notification (4.1)

The communication unit 120 of the main body 10 transmits the notification to the communication unit 242 of the operation unit 20.

4.1.1.1: Communication Unit 242: Receive Notification (4.1)

The communication unit 242 of the program 240 of the operation unit 20 receives the notification from the main body 10.

4.1.1.1.1: Communication Unit 242: Transmit Notification (4.1.1)

The communication unit 242 of the program 240 transmits the notification to the communication unit 224 of the application 222. Before or at the time of this transmission, some process (e.g., conversion of the notification to a certain format suitable for the application) may be performed by the program 240.

3.1.1.1: Communication Unit 224: Pass Notification to Start Up Processing Unit (4.1.1)

The communication unit 224 of the application 222 receives the notification, and passes the notification to the start up processing unit 223.

3.1.1.1.1: Start Up Processing Unit 223: Utilize Notification (3.1.1.1)

The start up processing unit 223 of the application 222 utilizes the received notification for the start up process. The notification includes information such as parameters of the main body 10 necessary for starting up the operation unit 20.

In the present embodiment, transmission of a notification in the direction from the main body 10 to the operation unit 20 is described. However, transmission of a notification in the reverse direction (from the operation unit 20 to the main body 10) may be performed.

Effect of the present embodiment will be described. As described above with reference to FIGS. 5 and 6, in the information processing apparatus 1 according to the present embodiment, in a case in which the main body 10 and the operation unit 20 start in parallel (it is not necessary to start at the same time; "start in parallel" includes a case in which there is an overlap in two starting-up processes), the operation unit 20 starts the program 240 in conjunction with the OS 220, and when the start up process of the operation unit 20 by the program 240 is completed, the program 240 transmits a ready state notification to the main body 10. In response to receiving the ready state notification, the main body 10 transmits, to the program 240, a notification to the application 222, and the program 240 transmits the notification received from the main body 10 to the application 222 that is started after the OS 220 starts up.

In a conventional device in which a main body 10 and an operation unit 20 are operated by respective CPUs, in order for the main body 10 to perform processes that require communication with the operation unit 20 at time of starting up the device, the main body 10 must wait until a start up process of the OS 220 of the operation unit 20 has completed and the main body 10 receives a ready state notification from the application 222. On the other hand, in the present embodiment, the program 240 that can run independently of the OS 220, which is responsible for a part of the start up process of the operation unit 20, is provided in the operation unit 20, and the program 240 transmits a ready state notification to the main body 10 in advance before starting up of the application 222 is completed. Accordingly, compared to the conventional configuration not having the program 240 in the operation unit 20, the main body 10 can receive the ready state notification from the operation unit 20 earlier than the conventional configuration. Therefore, the main body 10 can execute a "process requiring communication with the operation unit" earlier than the conventional configuration, thereby eliminating or reducing wait time from the "independent start up process" to the "process requiring communication with the operation unit". As a result, time required for starting up can be reduced.

As described above, the operation unit 20 includes the OS 220, the application 222, and the program 240. Specific examples of the OS 220, the application 222, and the program 240 will be described in the following.

The OS 220 may be a general OS such as Android, Windows, and mac OS. The present embodiment describes a case in which the OS 220 is Android.

Types of the application 222 may differ depending on the OS 220. In a case in which the OS 220 is Android, as in the present embodiment, an application for Android is generally used.

Requirement for the program 240 is that the program 240 needs to complete starting up earlier than the application 222. In the present embodiment, the program 240 runs as a daemon process, which runs in the background.

As the application 222 and the program 240 run as different processes, communication means between the processes (inter-process communication) is required. As a means of inter-process communication, Binder mechanism, which is implemented in Android for example, may be used. However, other means may be used.

As operations performed by the program 240 were originally performed by the single application 222, in a case in which the operations are divided into the application 222 and the program 240, a means of exchanging the parameters is necessary. Exchange of parameters is realized by Binder mechanism, but other methods may be used if exchange of parameters is possible.

Communication between the operation unit 20 and the main body 10 may be performed through a general connection means such as USB or a wireless LAN. In the configuration according to the present embodiment, the communication unit 242 in the program 240 of the operation unit 20 communicates with the communication unit 120 of the main body 10. In order to reduce frequency of communication, contents of notification transmitted from the main body 10 may be retained internally by the program 240. As a means for retention, a method of outputting to a file using a file I/O means may be used. When contents of notification are used by the application 222, it is also possible to transmit the notification from the program 240 to the application 222, and to store the notification in the application 222.

[First Variation]

Figure 7:
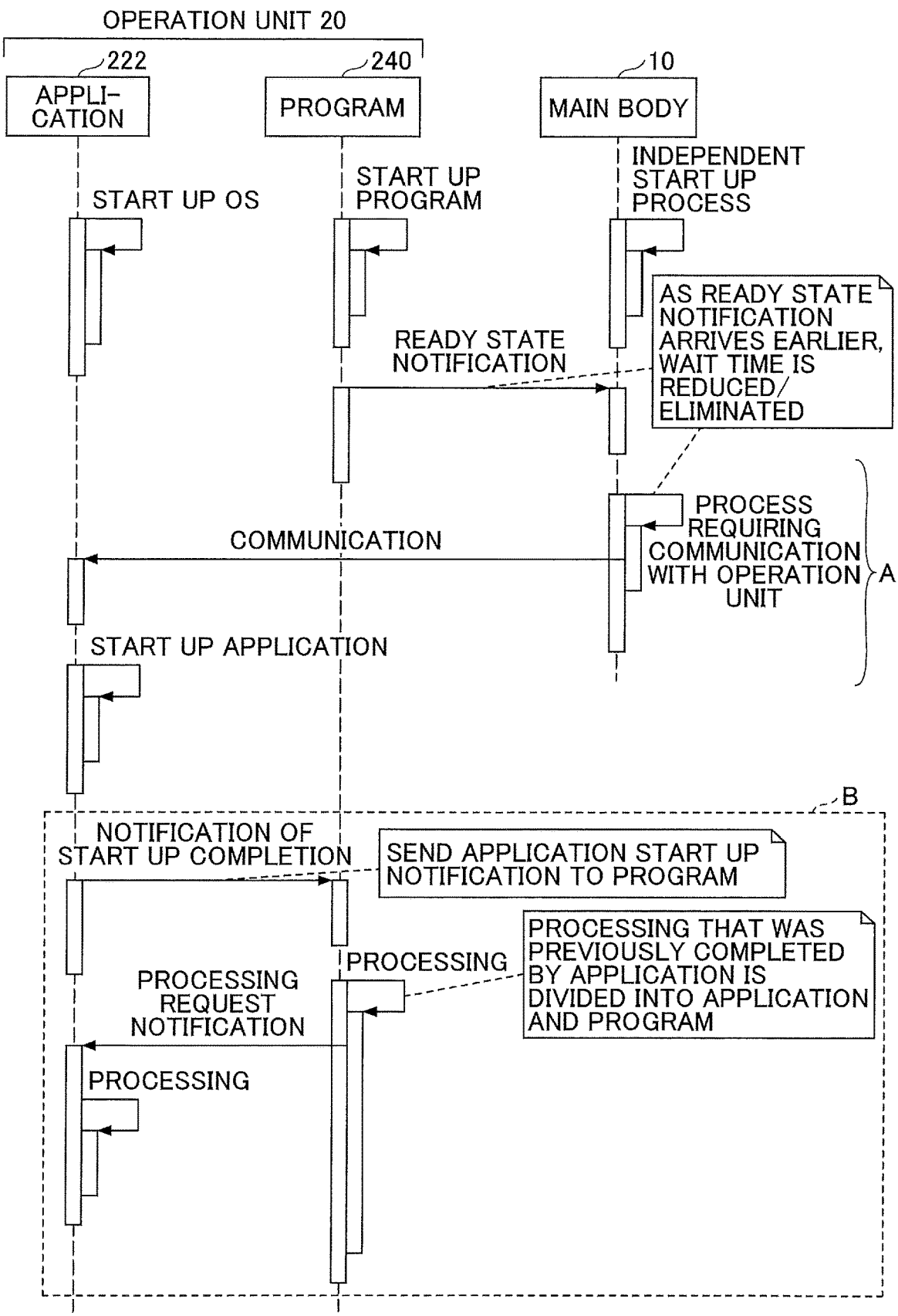
FIG. 7 is a start up sequence diagram according to a first variation.

Next, a first variation of the present embodiment will be described with reference to FIG. 7. FIG. 7 is a sequence diagram at a time of starting up in the first variation.

According to the present embodiment, a process (such as a process of starting up the operation unit 20) that was previously completed by the application 222 is divided into the application 222 and the program 240. Therefore, depending on a process, it is necessary to transmit and receive a notification of a processing request between the application 222 and the program 240, in order to execute the process.

Because the program 240 starts up earlier than the application 222, a case may occur in which the application 222 has not completed a start up process at a time when a processing request is to be transmitted from the program 240 to the application 222, as illustrated in section A in FIG. 7 for example. However, if the program 240 completely suspends processing of the program 240 until the application 222 has completed a start up process, a time required for starting up becomes longer.

In order to solve this problem, in the first variation, for example, as illustrated in a section B of FIG. 7, after the application 222 has started, the application 222 transmits, to the program 240, a notification of start up completion notifying that the application 222 has completed its start up process, and the program 240 transmits a processing request notification to the application 222 after receiving the notification of start up completion from the application 222.

In order to realize a process flow illustrated in FIG. 7, the application 222 may include, for example, the following functions.

A notification transmission unit that transmits a notification of start up completion of the application 222 to the program 240.

A notification receiving unit that receives a processing request from the program 240.

A processing execution unit that executes processing in response to receiving a processing request from the program 240.

Similarly, the program 240 may include, for example, the following function.

A notification receiving unit that receives a notification of start up completion from the application 222.

[Second Variation]

Figure 8:
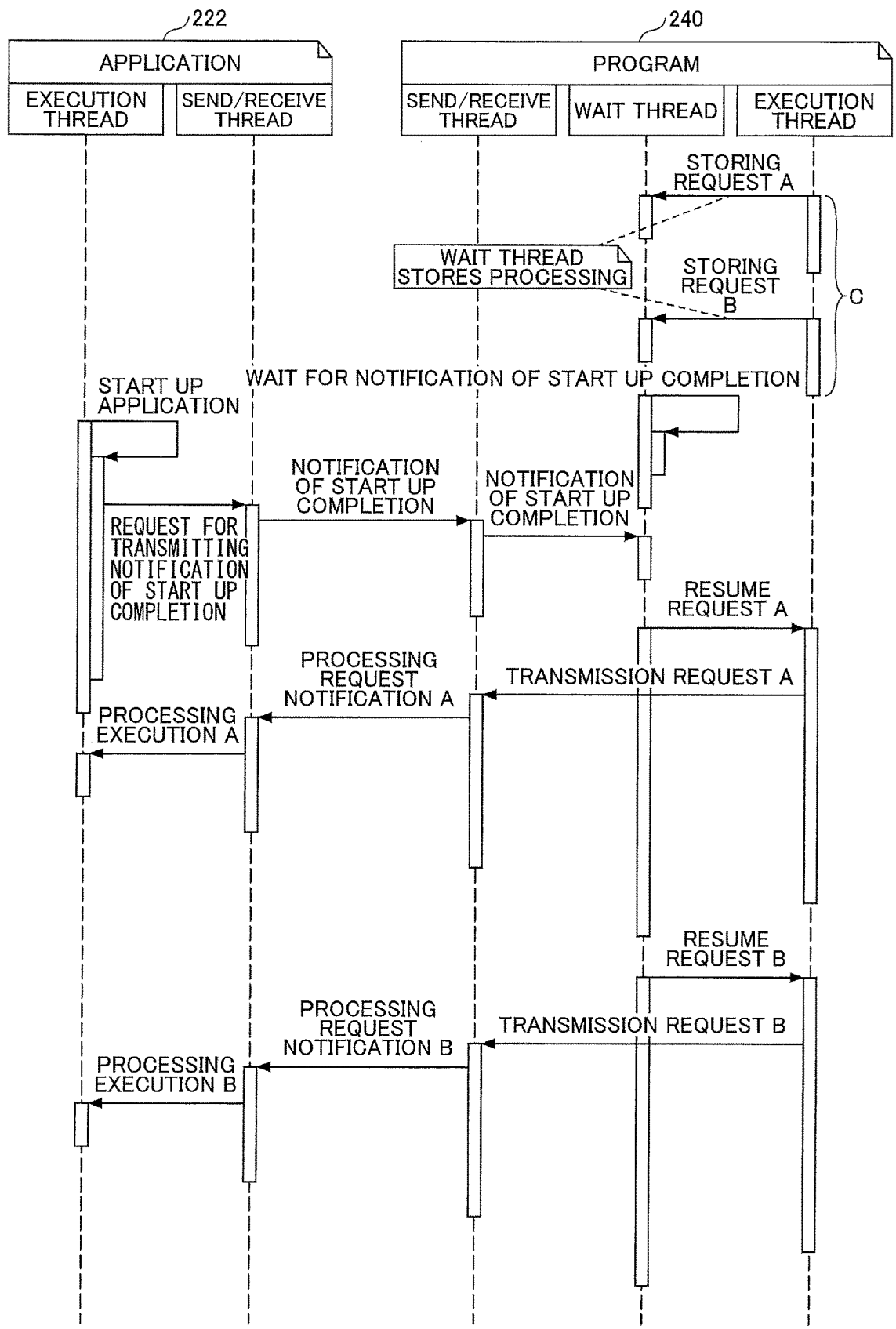
FIG. 8 illustrates a sequence diagram of a process performed between an application and a program in a second variation.

A second variation will be described with reference to FIG. 8. FIG. 8 is a sequence diagram describing a process performed between the application 222 and the program 240 according to the second variation.

In the second variation, as illustrated in FIG. 8, an "execution thread" that executes processing of the program 240 and a "wait thread" that waits for the application 222 to start are provided in order to reduce a time required for waiting for a notification of start up completion from the application 222 described in the first variation.

When the execution thread is to request processing of the application 222, the execution thread once requests the wait thread to store processing, as illustrated by the section C illustrated in FIG. 8, for example. By requesting the wait thread to store processing, the execution thread can continue a process of the program 240 as is, and occurrence of waiting for the application 222 to start can be reduced.

In order to realize a process flow illustrated in FIG. 8, the program 240 may include, for example, the following functions.

The execution thread that executes the process of the program 240, requests the application 222 to store the processing, receives a restart request, and submits a transmission request.

The wait thread that receives the storing request from the execution thread, stores the request, and issues a restart request when a notification of start up completion is received from the application 222.

A send/receive thread that receives a notification of start up completion, transmits a processing request notification and a notification of start up completion, and passes a notification of start up completion to the wait thread.

A storage means for storing a storing request with the order in which the storing request is received.

Similarly, the application 222 may include the following functions.

A send/receive thread that transmits a notification of start up completion, receives a processing request notification, and passes the processing request notification to an execution thread.

The execution thread that starts up the application 222, receives the processing request from the program 240, and executes the processing.

[Third Variation]

A third variation will be described with reference to FIGS. 9 to 14. In the third variation, both the features of the first variation and the features of the second variation are applied to the configuration of the present embodiment.

Figure 9:
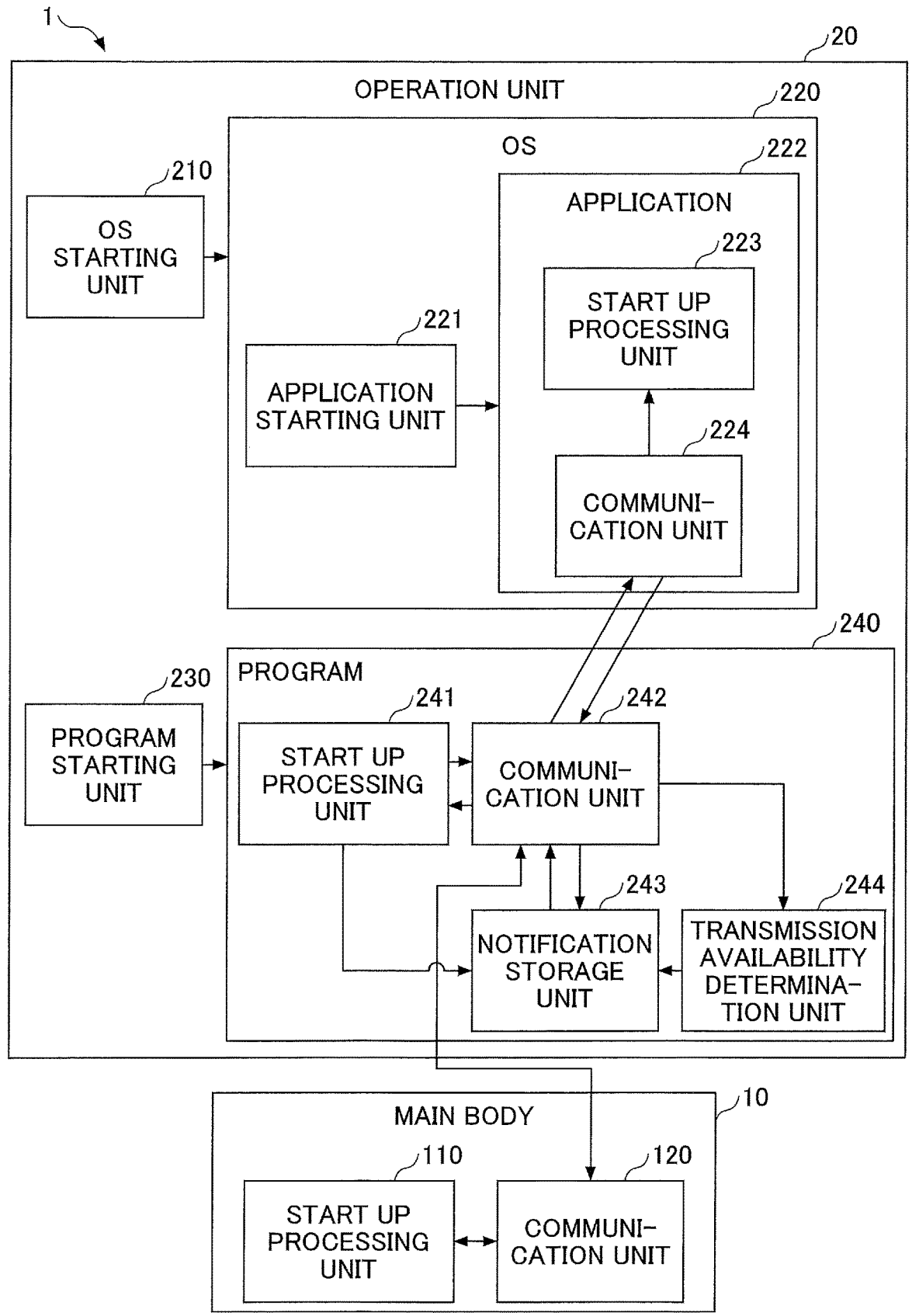
FIG. 9 is a functional block diagram of an information processing apparatus according to a third variation.

FIG. 9 is a functional block diagram illustrating the information processing apparatus 1 according to the third variation. As illustrated in FIG. 9, in the third variation, the program 240 further includes a notification storage unit 243 and a transmission availability determination unit 244.

The communication unit 224 of the application 222 has, in addition to the functions of the above-described embodiment, a function of transmitting a notification of start up completion to the communication unit 242 of the program 240 when the application 222 has completed the start up process of the application 222.

The communication unit 242 of the program 240 transmits a ready state notification received from the start up processing unit 241, to the main body 10. The communication unit 242 passes a notification received from the main body 10 to the notification storage unit 243. Further, the communication unit 242 passes a notification of start up completion of the application 222 received from the communication unit 224 of the application 222, to the transmission availability determination unit 244.

The notification storage unit 243 of the program 240 periodically receives a value of a state maintained by the transmission availability determination unit 244, and stores a notification received from the communication unit 242 is received, while the value is "unavailable". If multiple notifications have been received from the communication unit 242, the notification storage unit 243 stores the notifications, in the order received. When a value of the state changes to "available", the notification storage unit 243 passes the previously stored notification to the communication unit 242. If multiple notifications have been received, the notification storage unit 243 passes the stored notifications to the communication unit 242 in the order in which the previously stored notifications were received.

When a determination is requested from the communication unit 242, the transmission availability determination unit 244 of the program 240 passes a value ("available" or "unavailable") of the state retained internally. A value of the state is initially set to "unavailable". When a notification of start up completion is received from the communication unit 242 of the program 240, the value is changed to "available".

FIG. 10 is a diagram illustrating an external sequence when starting up the information processing apparatus 1 according to the third variation. The following describes only differences from the diagram of the external sequence according to the embodiment that is described with reference to FIG. 5.

4.1.1: Store Notifications

When a notification of start up completion is received from the main body 10 in Step 4.1 in a state in which the program 240 has not received the start completion notification from the application 222, the program 240 of the operation unit 20 stores the notification.

4.1.2: Executable Processing Other than Transmission

After storing the notification, the program 240 of the operation unit 20 continues to a process other than transmission of the notification. As the program 240 continues processing, a case, in which the program 240 falls into a complete waiting state for application start up, can be avoided.

3.1.1: Notification of Start Up Completion

When the application 222 has completed the start up process in Step 3.1, the application 222 transmits a notification of start up completion to the program 240.

3.1.1.1: Transmit Notification

When the program 240 of the operation unit 20 receives the notification of start up completion from the application 222, the program 240 transmits the notification that has been stored at Step 4.1.1 to the application 222. At this time, if multiple notifications have been stored at Step 4.1.1, the notifications are transmitted in the order in which the notifications were stored.

Note that "3.1.2: start up process" and "3.1.2.1: utilize notification" in FIG. 10 are similar to "3.1.1: start up process" and "3.1.1.1: utilize notification" in FIG. 5, respectively.

Figure 11A:
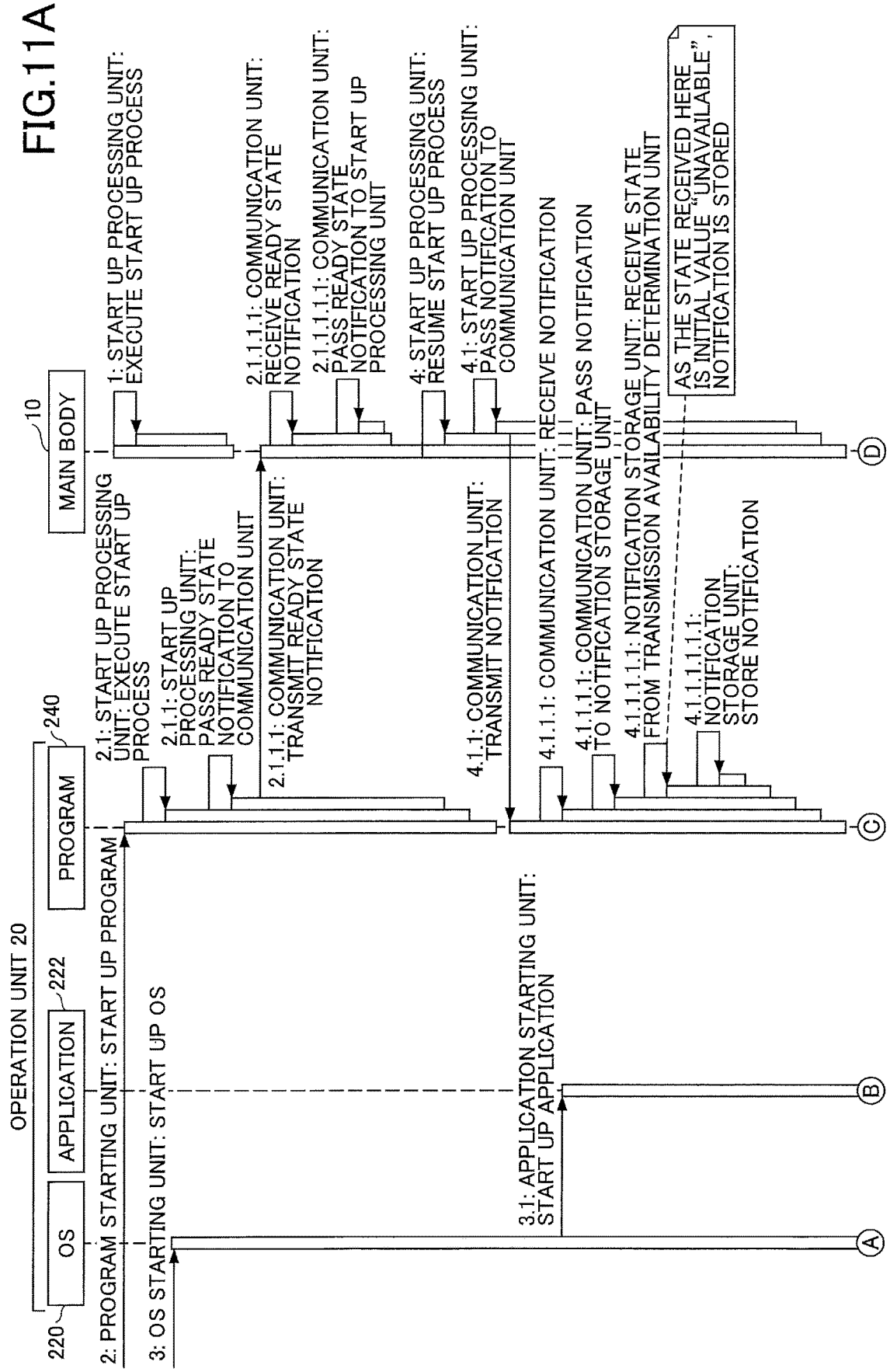
FIG. 11A illustrates a start up internal sequence diagram (1) in the third variation.
Figure 11B:
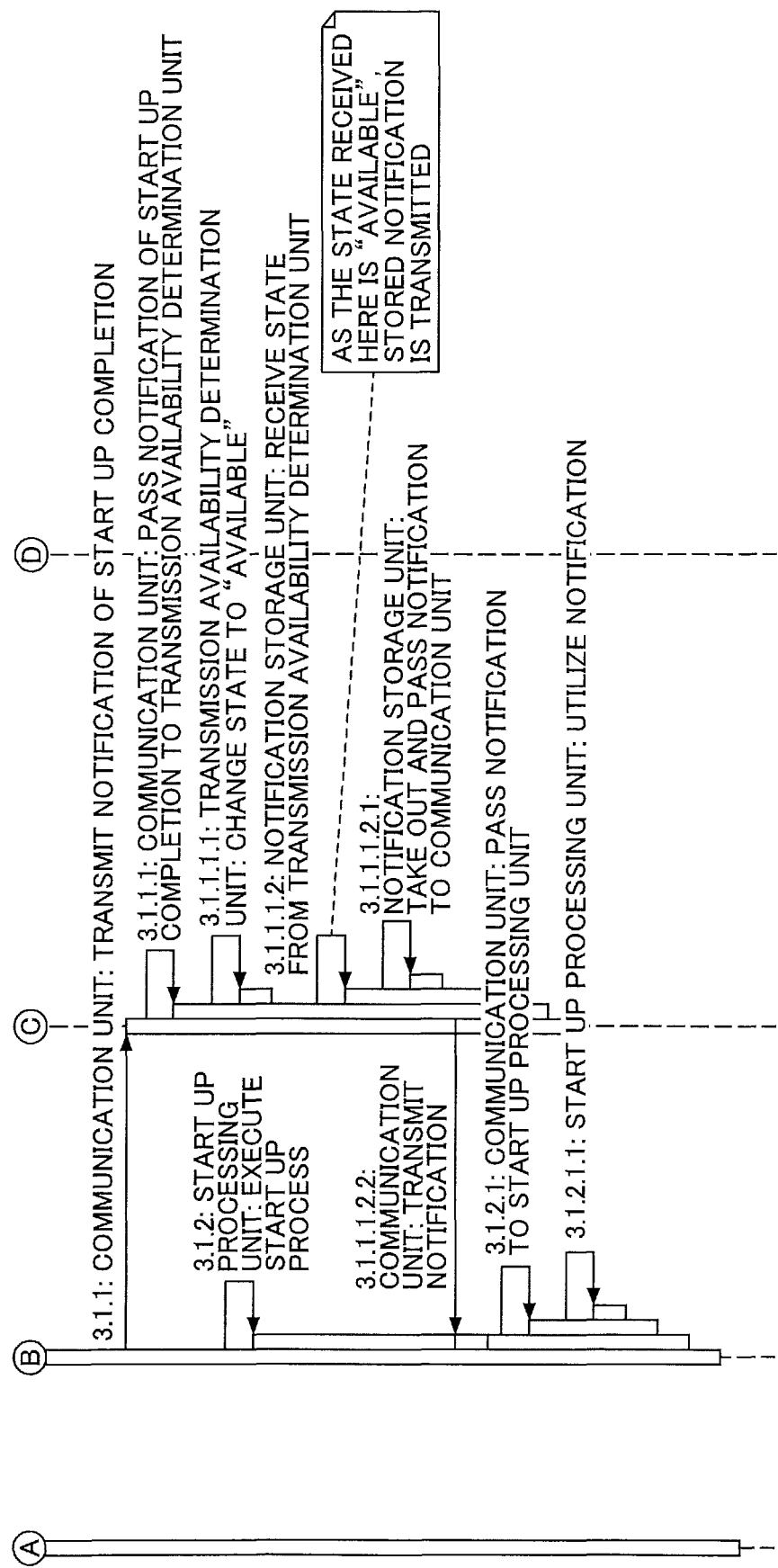
FIG. 11B illustrates a start up internal sequence diagram (2) in the third variation.

FIGS. 11A and 11B are diagrams illustrating an internal sequence when starting up the information processing apparatus 1 according to the third variation. Only differences from the diagram of the internal sequence according to the embodiment, which is described with reference to FIG. 6, will be described.

4.1.1.1.1: Communication Unit 242: Pass Notification to Notification Storage Unit 243 (4.1.1)

The communication unit 242 of the program 240 of the operation unit 20 passes the notification received in step 4.1.1.1 to the notification storage unit 243.

4.1.1.1.1.1: Notification Storage Unit 243: Receive State from Transmission Availability Determination Unit 244 (4.1.1).

The notification storage unit 243 of the program 240 of the operation unit 20 receives a value of the state from the transmission availability determination unit 244. Because an initial value of the state is "unavailable", "unavailable" is passed here.

4.1.1.1.1.1.1: Notification Storage Unit 243: Store Notification (4.1.1)

As the state of "unavailable" is received, the notification storage unit 243 of the program 240 of the operation unit 20 stores the notification internally. When multiple notifications are received and stored, it is necessary to store the notifications by maintaining the order in which the notifications are received. Examples of the storing method include a method of storing messages in a message queue by using a message-passing mechanism between threads, and a method of storing and retrieving messages by implementing a queue structure of a general data structure. A practical example of storing notifications will be described below with reference to FIGS. 12 and 13.

3.1.1: Communication Unit 224: Transmit Notification of Start Up Completion (3.1.1)

When the start up process of the application 222 in Step 3.1 is completed, the communication unit 224 of the application 222 of the operating unit 20 transmits, to the program 240, a notification of start up completion of the application 222. A criterion of determining completion of the start up process of the application 222 is not limited to a specific criterion, but if it is determined that the start up process of the application 222 in Step 3.1 is completed, the application 222 at least needs to be ready for communication with the program 240 for sending notifications.

3.1.1.1: Communication Unit 242: Pass Notification of Start Up Completion to Transmission Availability Determination Unit 244 (3.1.1.1)

When the notification of start up completion is received from the application 222, the communication unit 242 of the program 240 of the operation unit 20 passes the notification of start up completion to the transmission availability determination unit 244.

3.1.1.1.1: Transmission Availability Determination Unit 244: Changes State to "Available" (3.1.1.1)

The transmission availability determination unit 244 of the program 240 of the operation unit 20 changes a value of the state, which is internally retained by the transmission availability determination unit 244, from "unavailable" to "available".

3.1.1.1.2: Notification Storage Unit 243: Receive State from Transmission Availability Determination Unit 244 (3.1.1.1).

The notification storage unit 243 of the program 240 of the operation unit 20 periodically receives the state from the transmission availability determination unit 244, and checks a value of the state.

3.1.1.1.2.1: Notification Storage Unit 243: Take Out Notification and Pass Notification to Communication Unit 242 (3.1.1.1)

In a case in which the checked state is "available", the notification storage unit 243 of the program 240 of the operation unit 20 takes out the stored notification to pass the notification to the communication unit 242. An example of retrieval of the stored notification will be described below with reference to FIGS. 12 and 13.

3.1.1.1.2.2: Communication Unit 242: Transmit Notification (3.1.1.1)

The communication unit 242 of the program 240 of the operation unit 20 transmits the notification that is passed by the notification storage unit 243 to the application 222.

Figure 12:
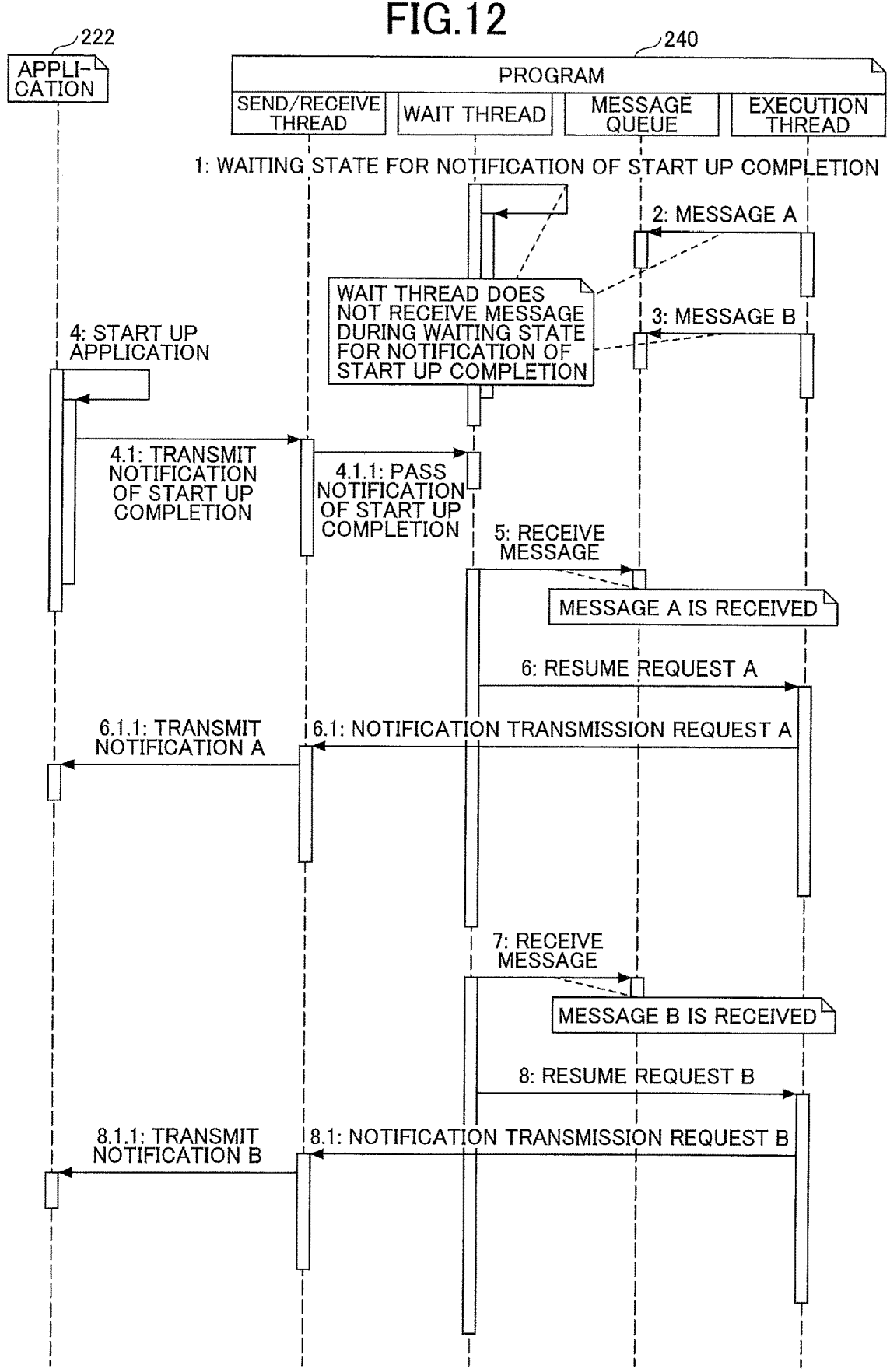
FIG. 12 illustrates a sequence diagram of a process performed between the application and the program in the third variation.

An example of a method of storing a notification will be described with reference to FIGS. 12 and 13. FIG. 12 is a sequence diagram of a process performed by the application 222 and the program 240 according to the third variation.

A "message" mentioned in FIG. 12 is used for information exchange between processes or between threads, and a transmission function and a reception function are provided. When a sender sends a message using the transmission function, the message is once stored in a location called a message queue. When a receiver calls the reception function once, one message can be received in the order stored in the message queue.

The message management mechanism may be, for example, a general message management mechanism provided in C programming language. For example, in C programming language, the snd_msg function can be used to send a message, and the rcv_msg function can be used to receive a message.

In the example of FIG. 12, during a waiting state for notification of start up completion of the application 222, by not retrieving, by the wait thread, a message triggering a notification transmission process, messages are stored in the message queue in the order in which the messages are transmitted, which is synonymous with a storing operation of the notifications.

Hereinafter, a sequence diagram of FIG. 12 will be described in detail.

1: Waiting State for Notification of Start Up Completion

The "wait thread" of the program 240, which is a dedicated thread that waits for a notification of start up completion, first becomes a waiting state for the notification of start up completion of the application 222. The wait thread and the message queue corresponds to the notification storage unit 243 and the transmission availability determination unit 244 of the function blocks. The wait thread does not call the message reception function during the waiting state.

2: Message A

3: Message B

The "execution thread" of the program 240 that mainly performs processing transmits, to the wait thread, a message triggering the notification transmission process in order to transmit the notification to the application 222. In the example of FIG. 12, two messages of "message A" (triggering a transmission process of "notification A") and "message B" (triggering a transmission process of "notification B") are transmitted in the order of "message A" and "message B". The execution thread corresponds to the start up processing unit 241 of the function blocks.

4: Start Up Application
4.1: Transmit Notification of Start Up Completion
4.1.1: Pass Notification of Start Up Completion When the application 222 completes the start up process, the application 222 transmits the notification of start up completion to the program 240. When the "send/receive thread" of the program 240 receives the notification of start up completion, the send/receive thread passes the notification of start up completion to the wait thread. The send/receive thread corresponds to the communication unit 242 of the function blocks.

5: Receive Message
6: Resume Request A
6.1: Notification Transmission Request A
6.1.1: Transmit Notification A The wait thread of the program 240 returns from the wait state in response to receiving the notification of start up completion, and calls the message reception function. In the example of FIG. 12, because the message A was stored in the message queue first, the message A is received at Step 5. In response to the wait thread receiving the message A (trigger a transmission process of the notification A), the wait thread issues a request for resuming the transmission process of the notification A. The execution thread that resumes the transmission process transmits a notification transmission request A to the send/receive thread. The send/receive thread transmits the notification A to the application 222.

7: Receive Message
8: Resume Request B
8.1: Notification Transmission Request B
8.1.1: Transmit Notification B Next, when the wait thread of the program 240 calls the message reception function, the wait thread receives message B. Thereafter, the message B is processed in a similar manner that the message A is processed, to transmit the notification B to the application 222.

Figure 13:
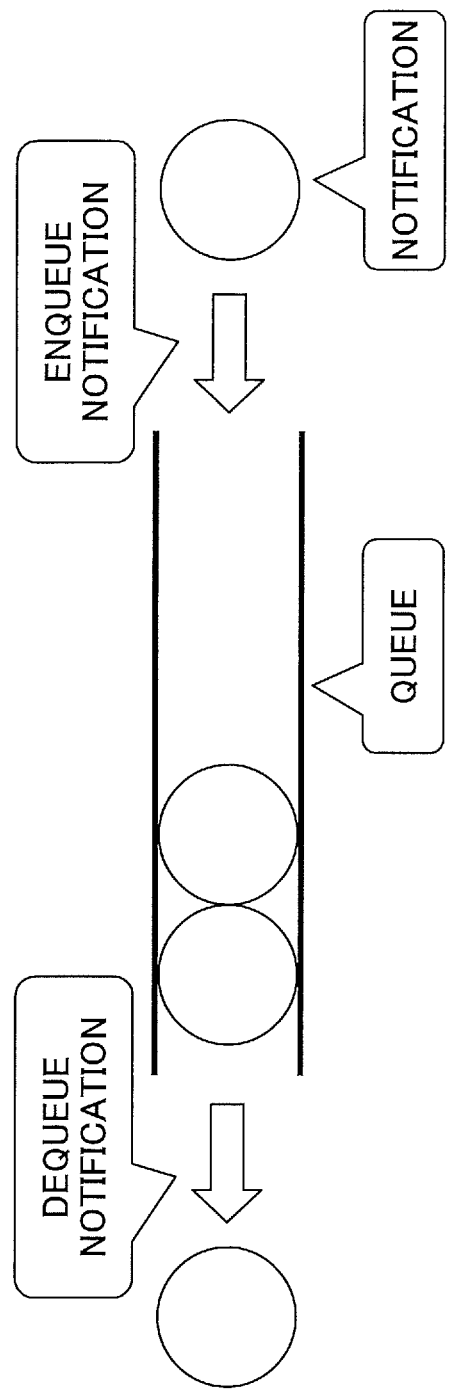
FIG. 13 is a schematic diagram illustrating an example of a storage structure using a queue.

FIG. 13 is a schematic diagram illustrating an example of a storage structure using a queue structure. In the example of FIG. 12, a general data structure, which is referred to as a queue structure illustrated in FIG. 13, is implemented. The queue structure stores (enqueues) data from one end, and takes out (dequeues) the data from the other end. This data structure enables data to be retrieved in the order of storing data.

The queue structure corresponds to the notification storage unit 243 of the program 240 of the function blocks. A notification is stored in the queue structure at step "4.1.1.1.1.1.1: notification storage unit: store notification" of the internal sequence in FIG. 11A, and in step "3.1.1.1.2.1: notification storage unit: take out notification and pass notification to communication unit", the notification stored in the queue structure is sequentially retrieved and is passed to the communication unit 242 for transmission.

Methods other than the method illustrated in FIGS. 12 and 13 may be used for storing a notification or a notification transmission trigger.

Effect of the third variation will be described. Because the program 240 starts up earlier than the application 222, a case may occur, in which the application 222 has not completed a start up process at a time when a processing request is to be transmitted from the program 240 to the application 222. However, if the program 240 completely suspends processing of the program 240 until the application 222 has completed a start up process, a time required for starting up becomes longer. In the third variation, when the start up process of the application 222 is completed, the application 222 transmits a notification of start up completion to the program 240, and the program 240 transmits, after the notification of start up completion is received, a notification that has been received from the main body 10 to the application 222. According to this configuration, the above-described problems can be solved and the program 240 can reliably transmit a notification after the application 222 has been started. Further, because the program 240 can execute other processing until a notification of start up completion is received from the application 222, the program 240 can be prevented from falling into a waiting state, and a time required for starting up can be shortened.

Also, in the third variation, the program 240 includes an execution thread for executing a process of the program 240, and a wait thread for storing processing to be performed after completion of starting the application 222. The program 240 causes the execution thread to execute the processing stored in the wait thread after receiving a notification of start up completion from the application 222. According to this configuration, when the execution thread is to make a processing request to the application 222, the execution thread can request the wait thread to store the processing once, and can continue the process of the program 240. Therefore, it is possible to avoid suspension of the process of the program 240 that occurs because of waiting for completion of the start up process of the application 222, and a time required for starting up can be further reduced.

In the third variation, the program 240 includes the transmission availability determination unit 244 configured to determine whether or not a notification received from the main body 10 can be transmitted to the application 222, and a notification storage unit 243 configured to store the notification. When a notification of start up completion is received from the application 222, the transmission availability determination unit 244 switches a state of the program 240 (or of the transmission availability determination unit 244) into a state in which the notification can be transmitted to the application 222, and the program 240 transmits the notification stored in the notification storage unit 243 to the application 222 in accordance with the state of the transmission availability determination unit 244.

Accordingly, the configuration allows the program 240 to accurately determine whether or not the notification can be transmitted to the application 222. That is, because the program 240 can accurately determine whether or not the start up process of the application 222 has completed, the program 240 can accurately determine whether or not the notification needs to be stored into the notification storage unit 243, and whether or not the notification to the application 222 should be transmitted. Accordingly, the transmission process of the notification to the application 222 by the program 240 can be performed more efficiently.

Figure 14:
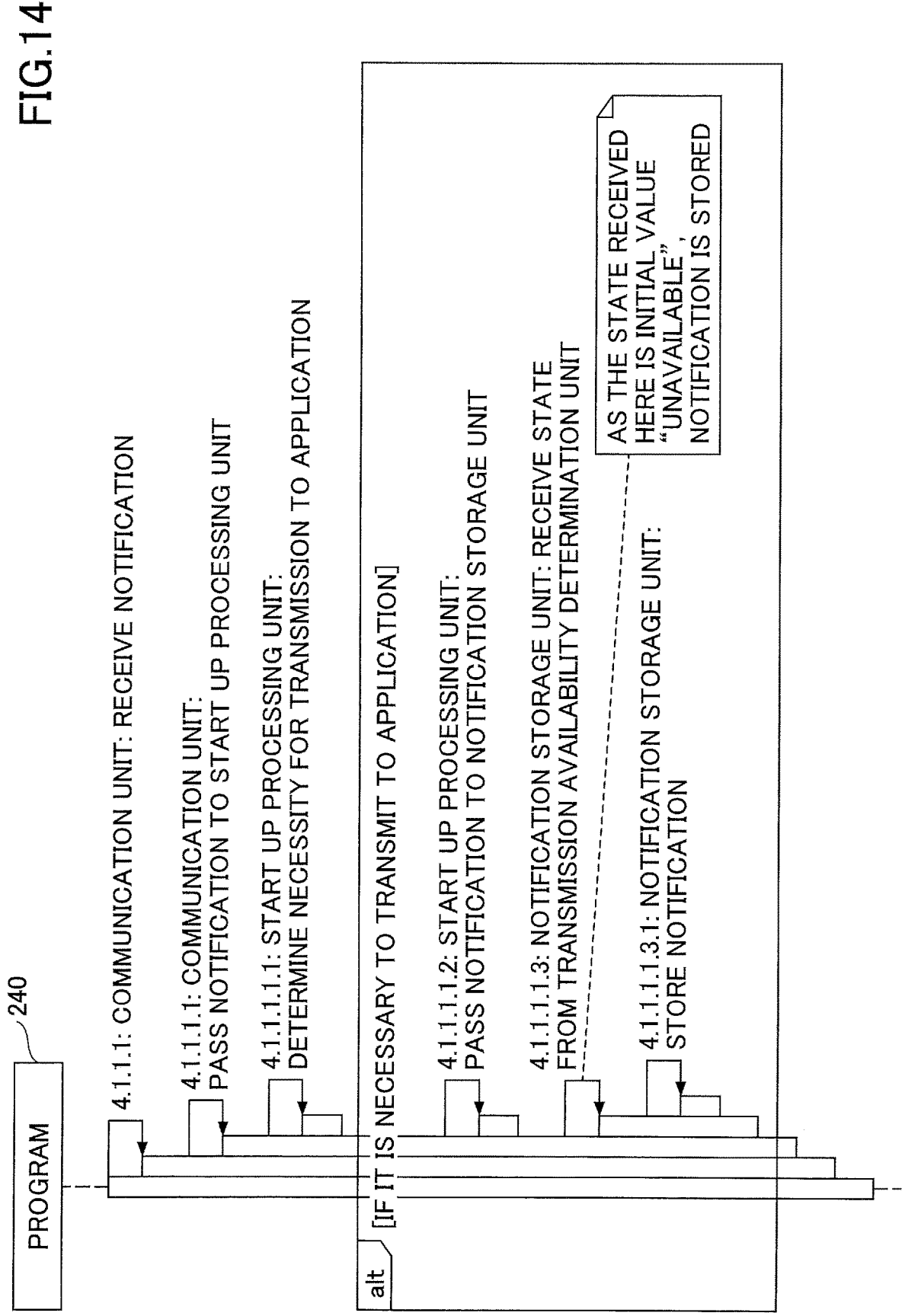
FIG. 14 is an internal sequence diagram for determining necessity of sending a notification to the application.

FIG. 14 is an internal sequence diagram in a case in which a determination as to whether or not a notification should be transmitted to the application is performed.

Among notifications received from the main body 10, a notification that is used only by the program 240 and that is not required to be transmitted to the application 222 may be included. Therefore, instead of transmitting all of the notifications to the application 222, by making a determination as to whether a notification is required to be transmitted to the application 222, only a notification necessary to be transmitted to the application 222 may be stored in the notification storage unit 243. Accordingly, among notifications from the main body 10, with respect to a notification that is not required to be transmitted to the application 222 (and that is used only in a process in the program 240), the storage in the notification storage unit 243 and the transmission to the application 222 can be omitted, to accelerate the start up process.

A brief flow of the above-described process is as follows. When the communication unit 242 of the program 240 receives a notification from the main body 10, the communication unit 242 passes the notification to the start up processing unit 241 instead of the notification storage unit 243. The start up processing unit 241 determines whether or not the notification contains a content required to be passed to the application 222, and if it is not necessary to be passed to the application 222, the notification is used for the start up process in the program 240, and if it is necessary to be passed to the notification storage unit 243, the notification is passed to the notification storage unit 243. The notification storage unit 243 stores in accordance with the state transmitted from the transmission availability determination unit 244 as described above.

The processing for performing such determination of necessity will be described with reference to FIG. 14, in which only the corresponding portion is extracted from the internal sequence diagrams in FIGS. 11A and 11B.

4.1.1.1.1: Communication Unit 242: Pass Notification to Start Up Processing Unit 241.

The communication unit 242 of the program 240 passes the notification received from the main body 10 in Step 4.1.1.1 to the start up processing unit 241.

4.1.1.1.1.1: Start Up Processing Unit 241: Determine Necessity for Transmission to Application 222.

The start up processing unit 241 of the program 240 determines whether or not the notification contains a content that is required to be passed to the application 222. If it is determined that the notification needs to be transmitted to the application 222 in this step, the process proceeds to the subsequent steps.

4.1.1.1.1.2: Start Up Processing Unit 241: Pass Notification to Notification Storage Unit 243

If it is necessary to transmit the notification to the application 222, the start up processing unit 241 of the program 240 passes the notification to the notification storage unit 243. If it is not necessary to transmit the notification to the application 222, the start up processing unit 241 of the program 240 utilizes the notification for the start up process in the program 240.

4.1.1.1.1.3: Notification Storage Unit 243: Receive State from Transmission Availability Determination Unit 244

4.1.1.1.1.3.1: Notification Unit: Store Notification

The sequence of this storing process is the same as Step 4.1.1.1.1.1 and Step 4.1.1.1.1.1 in FIG. 12.

When it is determined that the notification needs to be transmitted to the application 222 in Step 4.1.1.1.1.1, if a notification of start up completion has already been received from the application 222, the notification received at Step 4.1.1.1 may be transmitted to the application 222 without storing the notification into the notification storage unit 243. Accordingly, when the application 222 has already been started, a time for storing the notification can be omitted, and the notification can be transmitted to the application 222 more quickly.

Further, the program 240 may be configured to extract, from the notification received from the main body 10, only information that needs to be transmitted to the application 222, to create a new notification from the extracted information, and to transmit the created new notification to the application 222. Accordingly, the transmission data amount can be reduced by deleting, at the program 240, information unnecessary for the application 222, and a time required for data transmission time can be reduced.

As described above, the present embodiment has been described with reference to the specific examples. However, the present invention is not limited to these embodiments. Those embodiments, to which design variations have been made by those skilled in the art, are also encompassed by the present disclosure as long as they possess the features of the present disclosure. Elements provided in each of the above described examples, and the arrangement, conditions, shape, and the like thereof, may be suitably modified without being limited to those exemplified. Each element provided by each of the above-described examples may be combined as appropriate, unless there is a technical inconsistency.

What is claimed is:

1. An information processing apparatus comprising:
   a main body including hardware circuitry; and
   an operation device including a processor and a memory storing a program causing the processor to execute
      an operating system (OS);
      a program task that is configured to be executed independently of the OS, to start up earlier than the OS, and to perform a part of a start up process required for starting up the operation device; and
      an application task that runs on the OS and is configured to start up after the OS is started, to manage a connection between the main body and the operation device, and to perform a rest of the start up process of the operation device,
   wherein, upon starting the main body and the operation device,
      the operation device is configured to start executing the program task in addition to starting execution of the OS, and
      the program task is configured, in response to a completion of performing the part of the start up process, to transmit a ready state notification to the main body,
      the main body is configured to transmit, to the program task via the hardware circuitry, a notification to be transmitted to the application task in response to receiving the ready state notification,
      the program task is configured to transmit the notification received from the main body to the application task, after the application task is started
      the application task is configured to transmit a notification of start up completion to the program task in response to starting up the application task; and
      the program task is configured to transmit the notification received from the main body to the application task, after receiving the notification of start up completion.

2. The information processing apparatus according to claim 1, the program further causing the processor to execute an OS starting task configured to start executing the OS, and a program starting task configured to start executing the program task, wherein
   the OS includes the application task and an application start up task configured to start up the application task; and
   the program task includes a start up processing, task and a communication task, the start up processing task being configured to perform the part of the start up process and to generate the ready state notification, and the communication task being configured to transmit the ready state notification generated by the start up processing task, to receive from the main body the notification to be transmitted to the application task, and to transmit the notification to the application task.

3. The information processing apparatus according to claim 1, wherein the program task is configured to store the notification received from the main body, into the memory.

4. The information processing apparatus according to claim 1, the program task including an execution thread configured to execute processes to be performed by the program task, a wait thread configured to store a given process of the processes to be performed by the program task, the given process being performed after the application task is started; wherein
the program task is configured to cause the execution thread to execute the given process stored by the waiting thread, after receiving the notification of start up completion from the application task.

5. The information processing apparatus according to claim 1, the program task further including a transmission availability determination task configured to maintain a state indicating whether or not the notification received from the main body can be transmitted to the application task, and a notification storage task configured to store the notification; wherein
the transmission availability determination task is configured to change the state into an available state indicating that the notification received from the main body can be transmitted to the application task, in response to receiving the notification of start up completion from the application task, and
the program task is configured to transmit the notification stored by the notification storage task to the application task, in response to change of the state into the available state.

6. The information processing apparatus according to claim 5, wherein in a case in which the state maintained by the transmission availability determination task is the available state,
the program task is configured to transmit the notification received from the main body to the application task, by omitting storage of the notification by the notification storage task.

7. The information processing apparatus according to claim 5, wherein the program task is configured
to determine whether or not the notification received from the main body needs to be transmitted to the application task, and
to store the notification by the notification storage task, in a case in which it is determined that the notification needs to be transmitted to the application task.

8. The information processing apparatus according to claim 5,
wherein the program task is configured to extract, from the notification received from the main body, only information necessary to be transmitted to the application task, to generate a new notification using the information necessary to be transmitted to the application task, and to transmit the new notification to the application task.

9. A method of starting up an information processing apparatus including a main body and an operation device, the operation device being configured to execute an operating system (OS) and a program task, the program task being configured to be executed independently of the OS, to start up earlier than the OS, and to perform a part of a start up process required for starting up the operation device; the method comprising:
starting up the program task in addition to starting execution of the OS;
starting up an application task that runs on the OS and is configured to start up after the OS is started, to manage a connection between the main body and the operation device, and to perform a rest of the start up process of the operation device,
performing, by the program task, the part of the start up process;
transmitting a ready state notification to the main body, in response to a completion of performing the part of the start up process;
transmitting, from the main body to the program task, a notification to be transmitted to the application task in response to receiving the ready state notification;
transmitting, from the program task to the application task, the notification received from the main body after the application task is started;
transmitting, from the application task to the program task, a notification of start up completion in response to starting up the application task; and
transmitting, from the program task to the application task, the notification received from the main body after receiving the notification of start up completion.

10. A non-transitory computer-readable recording medium storing a computer program for starting up an information processing apparatus including a main body and an operation device, the computer program comprising:
a first program code that causes a processor in the operation device to perform a part of a start up process required for starting up the operation device, and to transmit a ready state notification to the main body, in response to a completion of performing the part of the start up process;
a second program code that causes the processor to start executing the first program code in addition to starting execution of an operating system (OS);
a third program code that runs on the OS and is configured to start up after the OS is started, to manage a connection between the main body and the operation device, and to perform a rest of the start up process of the operation device, wherein
the first program code is configured to start up earlier than the OS, and, to be executed independently of the OS
the main body is configured to transmit, to the first program code, a notification to be transmitted to the third program code in response to receiving the ready state notification,
the first program code is configured to transmit the notification received from the main body to the third program code, after the application task is started
the third program code is configured to transmit a notification of start up completion to the first program code in response to starting up the third program code; and
the first program code is configured to transmit the notification received from the main body to the third program code, after receiving the notification of start up completion.

* * * * *